UNITED STATES PATENT OFFICE.

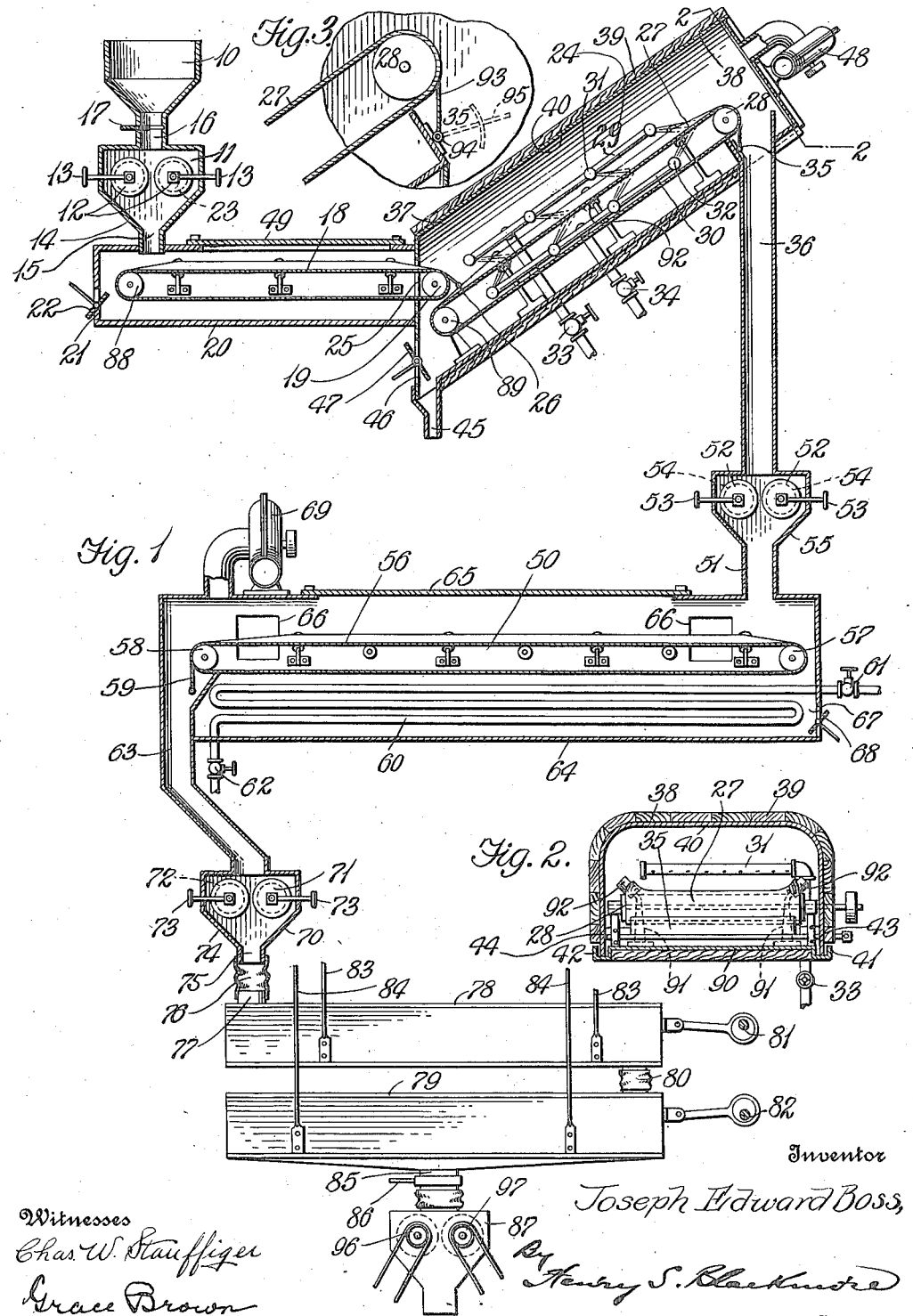

JOSEPH EDWARD BOSS, OF TORONTO, ONTARIO, CANADA.

APPARATUS FOR MAKING GRAIN PRODUCTS.

1,187,702.  Specification of Letters Patent.  Patented June 20, 1916.

Application filed November 1, 1913. Serial No. 798,712.

*To all whom it may concern:*

Be it known that I, JOSEPH EDWARD BOSS, a citizen of the United States, residing at Toronto, in the county of York and Province of Ontario, Canada, have invented certain new and useful Improvements in Apparatus for Making Grain Products, of which the following is a specification.

This invention relates to apparatus for making food forming products of cereal nature, and has for some of its objects the treatment of grain, such as wheat, rye, corn, barley, oats, rice and other starch bearing cereals, in a manner that constituents of the whole grain are associated with the finished flour and free from the bran or grain coating, also that the cellular structure of the grain is thoroughly disrupted and the starchy and other cell constituents liberated in a form that they may be so readily hydrated by action of water during kneading, that a larger increase in the volume of bread yielding product may be obtained than with products of similar nature produced heretofore, and it comprises a cereal food producing product of cellular disrupted nature by which a more thorough digestion of given quantities may be secured in shorter time and with greater nutritive and body building effect and with longer keeping and moisture retaining properties than the usual grit, meal or flour, whereby less yeast is required to produce greater leavening effect in shorter time and also less sugar and shortening is necessary in the working up of the product into foods.

In the prior art it has been customary to hydrate the grain by the action of water or steam, to a degree that the swelling will burst the grain cells, then dry, grind, bolt and flour the product, also to reduce the grain to a grit meal or flour, and expose the grit, meal or flour to the action of moisture or its steam variety and then dry and flour or reflour the product, which involves the double handling in the manufacture of the material, such as grinding, bran separating, cell disrupting, and regrinding to obtain the finished product, and by which means no valuable ingredients of the bran or cell tissue or coating can be introduced into the flour yielded, all of which are obviated in producing the product of the present invention, which comprises hydrating the grain while associated with the bran or grain coating, either as such or in a rolled or compressed form with the natural constituents and bran, by the action of water, preferably of moisture of steam form with or without the augmentation of heat, whereby the starch and other ingredients contained in cells are distended or swelled while retained by or associated with the outer coating of the grain and then directly subjected to the action of direct pressure or compression to such a degree and of such sudden nature that the fluid or water swelled cells are crushed and disrupted for the reason that the water contained therein is unable to pass out through the pores of the cell coating or cell coating fibers without disrupting them, and when ruptured effect the introduction into the cell content, such as starch, etc., of the soluble ingredients of the grain epidermis or skin, together with the product produced by the action of water associated with the grain oils under pressure, such as glycerin, which have a preserving and sweetening effect. Then after producing this super-nutritious product, it is dried, ground, bolted and floured.

When the oil in the grain, associated with water, is subjected to pressure, it becomes dissociated or transformed from its oleic ester character into glycerin and fatty acid, which latter combines with the starchy ingredients present and forms a nutritious product, while the glycerin acts as a moisture retainer and preservative, and the whole results in a sweeter product than that ordinarily secured.

As an example of a cereal product and process by which it is produced in accordance with the present invention, a product of wheat flour having the character described will be taken as an illustration, reference being directed to the accompanying drawing which diagrammatically illustrates the various steps and means for carrying out the process.

Referring to the drawings; Figure 1 represents a diagrammatic view of the combination of members of the apparatus, whereby the improved grain product is made or produced; Fig. 2 is a cross section of the grain hydrating device on lines 2—2 of Fig. 1, showing a preferred design of removable hood or housing and conveyer, together with means for heat insulation and removing condensation; and Fig. 3 is a detailed view showing a design of device for removing the product from the conveyer.

Similar numerals of reference represent corresponding parts in the several views.

In the illustration the numeral 10 represents a feed hopper communicating with the chamber 11 which is provided with the adjustable crushing rolls 12 coacting with the adjusting device or member 13, the said rolls 12 being provided with means for heating or cooling 23. The feeding or crushing members are suitably inclosed in the walls or housing 14, having the outlet 15.

The inlet 16 from the feed hopper 10 is provided with means, such as a slide valve or gate 17 for controlling or regulating the supply of grain to be treated, and the outlet 15 communicates with the carrier or conveyer 18, traveling on the conveyer and driving rolls 19 and idler 88 situated in a housing 20, provided with air inlet 21 controlled by a valve or gate 22, the conveyer passing into the hydrating member 24 through the opening 25, and is provided with means 26 for removing the material from the feed conveyer 18 and causing it to fall upon the inclined carrier 27, preferably comprising a porous fabric, such as cotton belting, which travels on the revoluble supports or conveyers comprising the driving roll 28 and idler 89.

Suitably situated in operative coactive distance, beneath and above the upper or conveying surface of the conveyer, are the steam or water vapor supply pipes or conduits 29 and 30, provided with jet discharges 31 and 32, the supply pipe 29 being controlled by valve 33 and the supply pipe 30 by valve 34.

The upper end of the carrier or belt is provided with a means 35 for removing material therefrom and discharging it into the chute, 36. This portion of the hydrating apparatus is secured in suitable housing 37 provided with the removable top or cover 38, whereby the interior may be readily reached. The housing 37 being composed of wood or other heat non-conducting material 39, provided with the non-corrosive lining 40, preferably of tinned copper or Monel metal. The bottom or base of the housing is provided with the troughs or channels 41 and 42, more clearly shown in Fig. 2, into which the lower edges 43 and 44 of the side members of the top 38 rest, whereby the housing is sealed and provided with drains for carrying off any condensation, and whereby it is carried to the discharge outlet 45. Connecting with the housing base 90 are the supports 91 for the angularly disposed guide rollers 92 for dishing the belt, conveyer or carrier for the purpose of retaining the hydrating material.

The lower end of the housing 37 is provided with the inlet 46 controlled by the valve or gate 47 and the upper end wall is provided with an exhaust device or means 48.

The housing 20 of the feed belt or conveyer 18 is provided with a removable closure or cover 49, whereby the interior may be readily reached.

The drying member 50 is provided with the feed means 51, including the crushing, or grain, or cell disrupting rolls 52, coacting with the adjusting or regulating device 53 and provided with the temperature controlling or regulating means 54, the whole being inclosed with or by suitable housing 55, which communicates with the feed chute 36.

The drying member comprises the conveyer or carrier 56, supported and actuated by a suitable driving roll 57 and idler 58, while the conveyer is provided at its discharge end with suitable adjustable scraping means 59 for removing material therefrom and discharging it into the chute 63. The drying member is provided with a heat supplying means, such as the heating coil 60, controlled by inlet valve 61 and outlet valve 62. The drying member is inclosed by suitable housing 64, provided with a removable top closure 65 and side closures 66, whereby the interior may be readily reached, and the air inlet 67 controlled by the valve or gate 68 and the exhaust means or device 69. From this drying member the material is discharged through the chute 63 into the grinding, scraping or milling apparatus 70, which includes the milling rolls 71 provided with temperature regulating means 72 and the coacting adjusting means 73, the grinding, scraping or milling members being inclosed in suitable housing 74.

The grinding, scraping or milling device is provided with the outlet 75, having a flexible conduit or member 76, which communicates with the inlet 77 of the bolter members 78 and 79, communicating with each other through the flexible duct or member 80 and actuated by the vibratory or agitating means 81 and 82 and secured by the flexible supports or hangers 83 and 84.

The bolter 79 is provided with the outlet 85 controlled by the gate or valve 86, from which the bolted material is discharged into suitable flouring member or apparatus 87.

The various conveyers and crushing and grinding rolls or members are driven in unison or coaction by power means, not shown, communicated to the said rolls or members through suitable belts or gearing in such a manner that the different members act jointly and collectively in their operation in the carrying out of the process, so that a continuous and uniform coaction of parts is assured and the feed of the different members suitably maintained and product discharged, the operation of the different members performed synchronously in the combination, enhancing the rapid finished production of the product desired, the power being imparted or communicated to the conveyers or members through the driving rolls 19, 28 and 57 of the feeder 18, the hydrating conveyer or carrier 27, and the drying conveyer 56, respectively, and to the other members through usual means of actuation.

Fig. 2 shows a detail of construction of the hydrating member, including the conveyer, and moisture supply means, and Fig. 3 shows a detail of device or scraper 35 for removing material from the conveyer 27, as it reaches the driven roll 28 and comprises the blade 93 rotatably operative on the support or pivot device 94, and adjustably regulated by suitable means 95 extending to the exterior. The scraping devices 26 and 57 are of similar form or character of construction and method of operation.

The flouring member 87 is provided with pulleys 96 and 97 for operating the flouring rolls at controlled and desired speeds to produce the required results.

As an example of a product and process by which the same is made, the conversion of wheat into the improved product will be taken, reference being directed to the accompanying drawings illustrating the various steps of the process employed.

The wheat grain is placed in the hopper 10 from which it is supplied through the opening 16 by operating the valve or gate 17. The wheat grain can be employed directly as such or may be preferably compressed by passing through or between the rollers 23 which are suitably adjusted with relation to each other by means of the adjusting devices 13 to compress the grain to the desired degree of compression. Power is then supplied to the various driving pulleys or gears of the apparatus and the gate valve 17 opened, whereby the grain as such or in its compressed form passes between the crushing rollers 23 and is deposited upon the traveling belt 18 through the supply duct 15. The grain as such or in its compressed form is deposited on the traveling belt 18, which is dished by the angularly disposed bearings communicating with the outer edges of the upper belt or conveyer for the purpose of preventing the grain from falling off, is carried in a forward progressive manner by the belt conveyer 18 and deposited upon the elevating conveyer or inclined carrier or belt 27 situated in the hydrating member, being removed from the belt 18 by the scraping device 26. The inclined carrier or belt 27 is also dished by elevating its edges by means of the angularly disposed rollers 92. As the grain is carried forward and upward on the inclined belt or conveyer 27 it is subjected to the action of steam or water vapor supplied above and below the belt through the nozzles or openings 31 and 32 of the conduits 29 and 30, the valves 33 in pipe 29 and 34 in pipe 30 being suitably opened to admit of the discharge of a sufficient amount of steam or water vapor to hydrate or swell the grain thereby distending its cells by the action of the internally absorbed water or moisture. This hydrated grain is then discharged into the hopper at the top of chute 36 by the action of the scraper 35. During the hydration of the grain in the hydrating member a current of air is gradually drawn through in an upward direction by action of the fan or suction device 48, air being admitted through the openings 21 and 46 controlled by the valves or gates 22 and 47 in such a manner and to such a degree that any steam or moisture is carried forward and kept from entering the feed chamber 20. Any moisture which may condense on the inner surface of the housing 37 will run down into the channels 41 and 42 at the bottom and be carried off through the discharge 45. The hydrated grain then falls through the chute 36 and enters the crushing or cell disrupting member passing through or between the rolls 52 suitably adjusted by the means 53 to thoroughly compress the hydrated grain to a degree that its internal cellular structure is ruptured in an attempt of the contained water or moisture to be forced out through the cellular coating at a speed greater than it can normally pass through the pores, the rolls being preferably heated by circulation of steam in the interior 54 of the rolls 52. The cell disrupted grain then falls through the feed means 51 and is deposited upon the traveling belt 56, whereby it is carried through the drying member 64 and subjected to the action of heat communicated through the steam coil 60 controlled by valves 61 and 62. At the same time the heating and drying of the grain is being accomplished a current of air is drawn through the drier by means of the exhaust device 69, the volume of air being controlled by the regulating valve or damper 68 which operates to regulate the area of the air supply opening 67. As the grain is dried and carried forward on the belt or carrier 56 and reaches its farther end, it is removed by the scraper 59 and deposited into the chute 63 from which it is supplied to the scraping or grinding member 74 provided with the disintegrating rolls 71 suitably heated or cooled as the case may require through the interior means 72, the rolls being suitably adjusted by means of the adjusting device 73. From this grinding, scraping or milling device the disintegrated grain passes out through the outlet 75 through the flexible conduit 76 into the bolting members 78 and 79 where the bran depleted of its soluble ingredients, which have been introduced into the liberated starchy cell content, is removed and the other ingredients containing the bran soluble content and the product of hydrated oils and starch of the grain are conveyed through the conduit or outlet 85 controlled by the gate or valve 86 into the final milling or flouring member 87 from which the finished product is discharged, it being prepared by passing through or between suitable rolls or flouring devices 96 and 97.

Treating the unground grain as such or in its compressed form, such as would result from passing the same through compressing rolls, whereby the cells are partly separated from each other and admit of the ready absorption of moisture between the cells and free passage through the cellular coating of the cell into the starchy contents, provides a means for introducing into the cell content some soluble ingredients of the grain, skin or bran, such as phosphates of potassium, calcium, magnesium, iron, etc., together with valuable nitrogenous constituents which enhance the health yielding and body building utility of the final product, so that it will practically contain the nutritious properties of the whole grain without association with the bran which has been depleted of its water soluble constituents. The woody fiber constituting the cell wall is disrupted, delivering or freeing the starchy contents, which is also associated with glycerin and aliphatic starchy esters, formed by the action of the fatty acids, liberated by the action of pressure and moisture in contact with the starchy ingredients. This product differs from products of the prior art, which are made after separating the bran from grits, meal or flour, in that it contains the additional health giving and nutriment delivering constituents of the whole grain derived from both the bran and the cell nucleus or germ.

The material of which the apparatus is constructed may be of any kind or character and the construction may be of any arrangement or form other than that shown and described so long as the integrity of the members and their coaction in operation are maintained in combination, whereby the desired result may be obtained without departing from the spirit of the invention.

The conveyer member, such as the continuous belt shown, for carrying the grain may be composed of any kind of material selective to the particular kind of grain to be treated, such as metal of gauze or other form, or of other material or of other character of structure or form of construction, or it may comprise other mechanism or device, such as rotary or rotatable conveyers or carriers, so long as the material employed is transported from member to member of the apparatus combination in a manner and form utilizable in the process and may comprise gravity means instead of applied power in cases where it is advantageous.

The terms or expression "means for rendering the soluble ingredients of the grain skin or bran transferable" employed in this specification and claims is intended to imply and does imply the means for treatment whereby the water-soluble ingredients of the bran or skin of the grain is hydrolyzed by water or otherwise and thus rendered transferable into the interior disrupted grain cells by external pressure, thus producing a new product, and the terms or expression "means for introducing into the liberated cell content soluble constituents of the skin or bran" implies the pressure which accomplishes such transfer after the water-soluble constituents of the grain bran or skin has been converted by hydrolysis into a condition capable of such transfer.

Having now described my invention what I claim as new and desire to secure by Letters Patent, is:—

1. The apparatus for making grain products which comprises the combination of successive coöperating means for hydrating the grain cells, means for transforming ingredients of the grain skin or bran into soluble substances while associated, exterior compression means for disrupting the hydrated grain cells and liberating the cell content and transfusing into the liberated cell content soluble constituents of the skin or bran, and means including the separation of depleted bran from the internal grain cell product for converting the product into a form utilizable for the preparation of food products.

2. The apparatus for making grain products which comprises the combination of successive coöperating means for compressing the grain, means for hydrating the grain cells, means for transforming ingredients of the grain skin or bran into soluble substances while associated, exterior compression means for disrupting the hydrated grain cells and liberating the cell content and transfusing into the liberated cell content, soluble constituents of the skin or bran, and means including the separation of depleted bran from the internal grain cell product for converting the product into a form utilizable for the preparation of food products.

3. The apparatus for making grain products which comprises the combination of successive coöperating means for hydrating the grain cells, means for transforming ingredients of the grain skin or bran into soluble substances while associated, exterior compression means for disrupting the hydrated grain cells and liberating the cell content and transfusing into the liberated cell content soluble constituents of the skin or bran, and means including the separation of depleted bran from the internal grain cell product for reducing the product to the desired state of subdivision.

4. The apparatus for making grain products which comprises the combination of successive coöperating means for compressing the grain, means for hydrating the grain cells, means for transforming ingredients of the grain skin or bran into soluble substances while associated, exterior compression means for disrupting the hydrated grain cells and liberating the cell content and transfusing into the liberated cell content soluble constituents of the skin or bran, and means including the separation of depleted bran from the internal grain cell product for reducing the product to the desired state of subdivision.

5. The apparatus for making grain products which comprises the combination of successive coöperating means for hydrating the grain cells, means for transforming ingredients of the grain skin or bran into soluble substances while associated, exterior compression means for disrupting the hydrated grain cells and liberating the cell content and transfusing into the liberated cell content soluble constituents of the skin or bran, and means including the separation of depleted bran from the internal grain cell product for flouring the product.

6. The apparatus for making grain products which comprises the combination of successive coöperating means for compressing the grain, means for hydrating the grain cells, means for transforming ingredients of the grain skin or bran into soluble substances while associated, exterior compression means for disrupting the hydrated grain cells and liberating the cell content and transfusing into the liberated cell content soluble constituents of the skin or bran, and means including the separation of depleted bran from the internal grain cell product for flouring the product.

7. The apparatus for making grain products which comprises the combination of successive coöperating means for hydrating the grain cells, means for transforming ingredients of the grain skin or brans into soluble substances while associated, exterior compression means for disrupting the hydrated grain cells and liberating the cell content and transfusing into the liberated cell content soluble constituents of the skin or bran; means for removing the depleted bran, and means for converting the product into a form utilizable for the preparation of food products.

8. The apparatus for making grain products which comprises the combination of successive coöperating means for compressing the grain, means for hydrating the grain cells, means for transforming ingredients of the grain skin or bran into soluble substances while associated, exterior compression means for disrupting the hydrated grain cells and liberating the cell content and transfusing into the cell content soluble constituents of the skin or bran, means for removing the depleted bran and means for converting the product into a form utilizable for the preparation of food products.

9. The apparatus for making grain products which comprises the combination of successive coöperating means for hydrating the grain cells, means for transforming ingredients of the grain skin or bran into soluble substances while associated, exterior compression means for disrupting the hydrated grain cells and liberating the cell content and transfusing into the liberated cell content soluble constituents of the skin or bran, means for removing the depleted bran, and means for reducing the product to the desired state of subdivision.

10. The apparatus for making grain products which comprises the combination of successive coöperating means for compressing the grain, means for hydrating the grain cells, means for transforming ingredients of the grain skin or bran into soluble substances while associated, exterior compression means for disrupting the hydrated grain cells and liberating the cell content and transfusing into the liberated cell content soluble constituents of the skin or bran, means for removing depleted bran, and means for reducing the product to the desired state of subdivision.

11. The apparatus for making grain products which comprises the combination of successive coöperating means for hydrating the grain cells, means for transforming ingredients of the grain skin or bran into soluble substances while associated, exterior compression means for disrupting the hydrated grain cells and liberating the cell content and transfusing into the liberated cell content soluble constituents of the skin or bran, means for removing depleted bran, and means for flouring the product.

12. The apparatus for making grain products which comprises the combination of successive coöperating means for compressing the grain, means for hydrating the grain cells, means for transforming ingredients of the grain skin or bran transferrable, exterior compression means for disrupting the hydrated grain cells and liberating the cell content and transfusing into the liberated cell content soluble constituents of the skin or bran, means for removing the depleted bran, and means for flouring the product.

13. The apparatus for making grain products which comprises the combination of a grain hydrating member, an external compression grain cell disrupting member including means for introducing the hydrated water-soluble constituents of the grain skin or bran into the disrupted internal grain cells, means for separating the depleted bran or skin, and means for comminuting the residue and blending the same.

14. The apparatus for making grain products which comprises the combination of a grain hydrating member, an external compression grain cell disrupting member including means for introducing the hydrated water-soluble constituents of the grain skin or bran into the disrupted internal grain cells, means for drying the composite product thereof, means for separating the depleted bran or skin, and means for comminuting the residue and blending the same.

15. The apparatus for making grain products which comprises the combination of a grain crushing member, a grain hydrating member, an external compression grain cell disrupting member including means for introducing the hydrated water-soluble constituents of the grain skin or bran into the disrupted internal grain cells, means for separating the depleted bran or skin, and means for comminuting the residue and blending the same.

16. The apparatus for making grain products which comprises the combination of a grain crushing member, a grain hydrating member, an external compression grain cell disrupting member including means for introducing the hydrated water-soluble constituents of the grain skin or bran into the disrupted internal grain cells, means for drying the composite product thereof, means for separating the depleted bran or skin, and means for comminuting the residue and blending the same.

17. In an apparatus for making grain products the combination of successive means for subjecting the grain cells and grain skin or bran to hydrolysis while associated, exterior pressure means for transfusing the hydrolyzed bran ingredients into the interior grain cells and disintegrating the cell contents, means for removing the depleted grain skin or bran and means for comminuting the product.

18. In an apparatus for making grain products the combination of successive means for compressing the grain, subjecting the grain cells and grain skin or bran to hydrolysis while associated, exterior pressure means for transfusing the hydrolyzed bran ingredients into the interior grain cells and disintegrating the cell contents, means for removing the depleted grain skin or bran and means for comminuting the product.

In testimony whereof I affix my signature in presence of two witnesses.

JOSEPH EDWARD BOSS.

Witnesses:
D. S. TOVELL,
H. M. CHRISTMAN.